H. TOBLER.
PROCESS OF SEPARATING HALOGEN FROM NATURAL BRINES.
APPLICATION FILED AUG. 14, 1918.
1,380,851. Patented June 7, 1921.
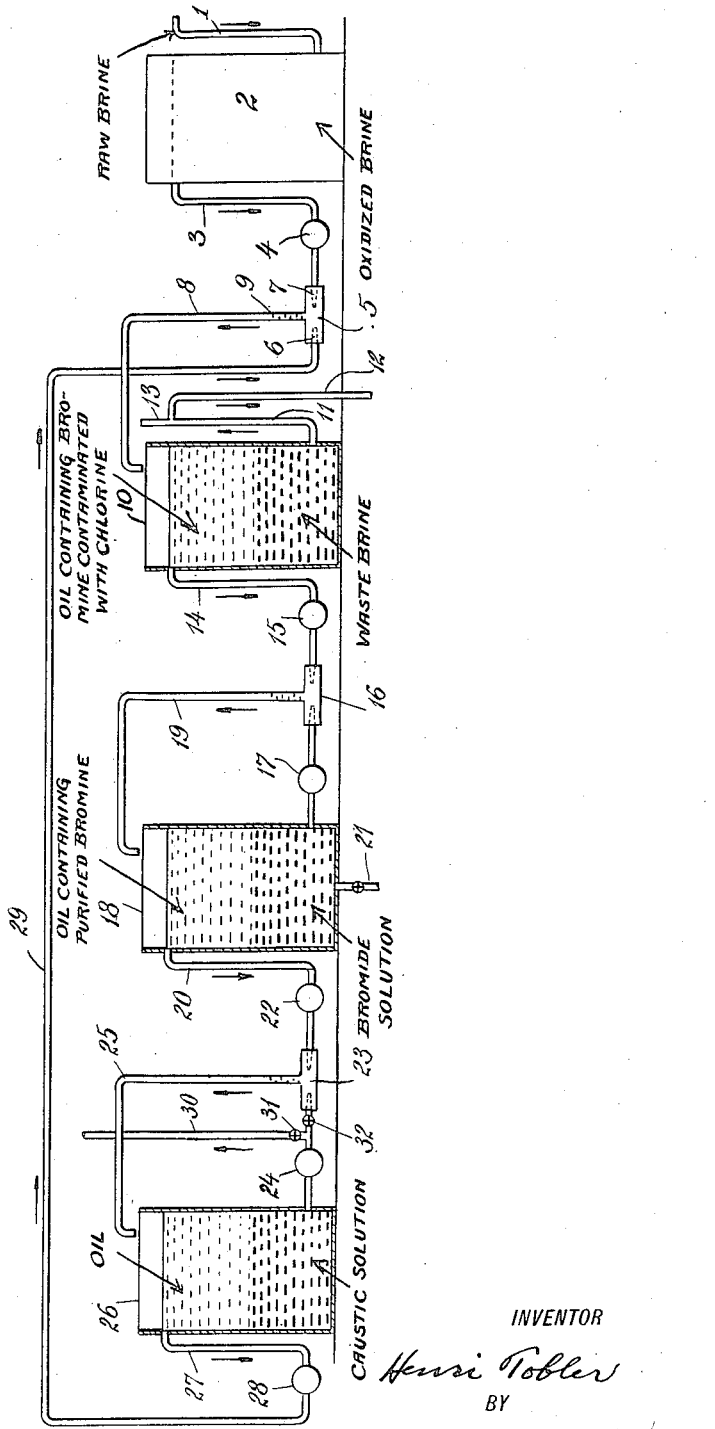
INVENTOR
Henri Tobler
BY
Pennie Davis Marvin & Edmonds
ATTORNEY

UNITED STATES PATENT OFFICE.

HENRI TOBLER, OF HACKENSACK, NEW JERSEY.

PROCESS OF SEPARATING HALOGEN FROM NATURAL BRINES.

1,380,851.  Specification of Letters Patent.  Patented June 7, 1921.

Application filed August 14, 1918. Serial No. 249,761.

*To all whom it may concern:*

Be it known that I, HENRI TOBLER, a citizen of the United States, residing at Hackensack, in the county of Bergen, State of New Jersey, have invented certain new and useful Improvements in Processes of Separating Halogen from Natural Brines; and I do hereby declare the following to be a full, clear, and exact description of the invention, such as will enable others skilled in the art to which it appertains to make and use the same.

The present invention relates to the recovery of a halogen or halogens from a liquid containing the halogens, particularly when the halogens are present in chemical combination, as is the case with natural brines such as are found in Michigan and in the Ohio river valley.

According to the present invention, the halogen, say, bromin, is first liberated from its chemical combinations in the brine, where necessary, as by suitable oxidation, whereupon the bromin dissolves in the brine or liquor. The next step consists in extracting or absorbing the bromin or like halogen from this liquor by treatment with a non-miscible liquid having the power of absorbing the halogen, as by chemical union therewith, but preferably without substantial chemical union therewith, as hereinafter explained in connection with the preferred embodiment of the process. For instance, a saturated hydrocarbon, when intimately mixed with the liquor containing the freed and dissolved bromin, will take up the bromin physically and without substantial chemical union therewith, and after separation of the two non-miscible liquids, the bromin can be recovered from the hydrocarbon and the hydrocarbon used over again.

The apparatus whereby the process can be carried out may vary greatly in its details. In the accompanying drawing is illustrated diagrammatically one arrangement of apparatus suitable for use in the process herein described and claimed.

In the drawing, the raw brine or other equivalent liquor containing the halogen in chemical combination, enters through pipe 1 into an oxidizing or decomposing apparatus 2, wherein the halogen, such as bromin, is freed from its chemical combination in the brine, as by electrolytic oxidation or by oxidation with chlorin, according to methods well understood. From this receptacle 2 the oxidized brine is delivered through a pipe 3 and pump 4 to a mixing chamber or agitator 5, here conventionally illustrated as comprising opposed jets 6 and 7, through which the streams of fluid to be intimately mixed are forcibly projected into one another. A discharge pipe 8 with baffles 9 carries the mixture of non-miscible liquids into a separating chamber 10, where separation occurs by gravity, the waste brine collecting at the bottom of the tank and ultimately flowing through pipes 11 and 12 to waste. A vent pipe 13 is provided as illustrated to prevent a siphon effect in pipes 11 and 12.

As a non-miscible liquid for injection through nozzle 6 into chamber 5 for intimate mixing with the oxidized brine, I prefer to use a light hydrocarbon and preferably a saturated light hydrocarbon having a distribution coefficient for halogen such as bromin with respect to said brine greater than about 6 and a density differing from that of the brine by more than about 0.2 (two-tenths) referred to the density of water as equal to one and also having a viscosity less than about three referred to the viscosity of water as unity. I have found that an oil of the character described can be intimately mixed with the brine with a minimum of agitation and that as soon as the agitation ceases it will separate rapidly from the brine without emulsification or solution in the brine and will extract the halogen from the brine with a high degree of efficiency thus making it practicable to carry out the extraction in a continuous manner as described with the use of a relatively small volume of oil. Such a material may be obtained in a practical way by collecting those portions of a crude oil of the Pennsylvania type which distil between 110° and 160° C., or by distilling this fraction from a gasolene which has been obtained from such a crude oil, without the use of a cracking process, or any process producing large amounts of unsaturated hydrocarbons.

This fraction contains a small amount of unsaturated hydrocarbons, generally less than 1% and these I dispose of by direct saturation with bromin (during which operation a small amount of hydrobromic acid is formed) and then washing by agitation with a 10% solution of caustic soda, whereby the hydrobromic acid is recovered and some resinous matter contained in the oil is separated. The oil is then ready for use as the absorbing or non-miscible liquid of the present process.

If, instead of using a substantially saturated hydrocarbon, an oil were used containing a considerable proportion of unsaturated bodies, the first inter-action between the oil and the bromin-bearing liquor would consist in the bromination of these unsaturated bodies. The bromin thus combined would not be readily recoverable, as such, because of its close union with the oil, and consequently, where the ultimate object is the separation of bromin as such, these unsaturated bodies should be eliminated as completely as possible from the oil. If, on the contrary, a brominated oil is the desired end product, then such an oil is selected as will give the desired product after treatment with the bromin-bearing brine.

In tank 10 since the two liquids are non-miscible and do not tend to emulsify or remain suspended in each other a stratification and separation readily takes place and the oil containing the halogen in solution may be quickly separated from the exhausted brine by the action of gravity.

Assuming the use of saturated oil as above explained, the light liquid leaving tank 10 through pipe 14 and pump 15 will carry the bromin dissolved in it, but not chemically united to any considerable extent. Therefore, it is an easy matter to recover the bromin as such from this oil and return the oil to mixing chamber 5 for another cycle. For some purposes a purification step is desirable before recovery of the halogen from the oil is attempted. Thus, in the recovery of bromin from natural brine, it is an ordinary incident of electrolytic oxidation or oxidation by means of chlorin, that there shall be present in the oil not only the bromin initially carried by the natural brine, but some chlorin not used up in freeing the bromin from its chemical combinations in the brine. To make sure that all the bromin is freed, it is good practice to slightly over-oxidize the brine. For the manufacture of chemically pure bromids and pharmaceutical preparations, this chlorin must be separated from the bromin and in accordance with the process of the present invention this purification is conveniently effected immediately after the non-miscible liquids have been separated by gravity. The step of purification may be effected by delivering the bromin-bearing oil into a mixing chamber 16 and there projecting it against a jet of purifying bromid delivered by a pump 17 from the lower part of a tank 18. As such purifying bromid, I may use sodium bromid, iron bromid, calcium bromid or the like, but preferably I use the impure mother liquor of the subsequent operations, whereby in the manufacture of pure bromids they are crystallized out of a somewhat impure solution, as hereinafter explained. The mixture of oil and purifying bromid formed in chamber 16 is delivered through pipe 19 into chamber 18, and inasmuch as the two liquids are non-miscible and do not tend to emulsify or remain suspended in each other, a stratification and separation readily take place and the purified oil solution of bromin is ultimately delivered through pipe 20, while the purifying bromid can be circulated over and over until exhausted and ultimately can be drawn off through waste pipe 21.

The next step consists in the recovery of the bromin from the oil. A pump 22 delivers the liquid to a mixing chamber 23, into which is delivered by a pump 24 an alkaline solution, such as sodium or potassium hydroxid, sodium or potassium carbonates or bi-carbonates. Such an alkaline solution, when thoroughly mixed with the oil in chamber 23 will chemically combine with the bromin to form sodium or potassium bromid as the case may be, and consequently, the mixture when delivered through pipe 25 to tank 26 will there stratify with the oil at the top in position to be pumped off through pipe 27 and pump 28 and ultimately returned through pipe 29 to nozzle 6, thereby completing its cycle.

Adjacent to pump 24 is an outlet pipe 30, controlled by suitable valves 31 and 32, so that from time to time the solution of alkaline bromid may be drawn off for evaporation. The crystalline product consisting of a mixture of bromids and bromates is then baked to convert the bromates into bromids and then is re-dissolved, filtered and evaporated to crystallization. The mother liquid of this evaporation can well be used as the purifying bromid of tank 18.

The process can be carried out with apparatus of low cost and small bulk and offers many practical advantages and economies.

I claim as my invention:

1. In the process of separating halogen from natural brine, the steps which comprise the oxidation of brine to liberate elementary halogen and the extraction of said liberated halogen from the brine by means of a pure saturated light hydrocarbon oil having a distribution coefficient for elementary halogen with respect to said brine greater than about 6.

2. In the process of separating halogen from natural brine, the steps which comprise the oxidation of brine to liberate elementary halogen, the extraction of said liberated halogen from the brine by means of a pure saturated light hydrocarbon oil having a distribution coefficient for elementary halogen with respect to said brine greater than about 6, and subsequently removing the dissolved elementary halogen from said oil by means of an aqueous alkaline solution at ordinary temperatures.

3. In the process of separating halogen from natural brine, the steps which comprise the oxidation of the brine to liberate elementary halogen, and the extraction of said liberated halogen from the brine by means of a saturated light hydrocarbon oil substantially free from halogenated hydrocarbon.

4. In the process of separating halogen from natural brine, the steps which comprise the oxidation of the brine to liberate elemenetary halogen, the extraction of said liberated halogen from the brine by means of a substantially saturated light hydrocarbon oil from which easily halogenated impurities have been removed; substantially as described.

5. In the process of separating halogen from natural brine, the steps which comprise the oxidation of the brine to liberate elementary halogen, the extraction of said liberated halogen from the brine by means of a substantially saturated hydrocarbon oil free from vigorously active solvents from which the bromin cannot be efficiently removed by means of dilute alkaline solutions at ordinary temperatures.

6. The method of recovering bromin from natural brine, which consists in oxidizing the brine to free the bromin, intimately mixing with a saturated hydrocarbon to absorb the bromin, purifying by contact with a non-miscible solution of a bromid, and ultimately recovering the purified bromin from the hydrocarbon; substantially as described.

7. In the process of separating halogen from natural brine, the steps which comprise the oxidation of brine to liberate elementary halogen and the extraction of said liberated halogen from the brine by means of a pure saturated light hydrocarbon oil.

8. In the process of separating halogen from natural brine, the steps which comprise the oxidation of the brine to liberate elemenetary halogen, the extraction of said liberated halogen from the brine by means of a light non-viscous oil from which easily halogenated impurities have been removed; substantially as described.

9. In the process of separating halogen from natural brine, the steps which comprise the oxidation of the brine to liberate elementary halogen, the extraction of said liberated halogen from the brine by means of an oil which has a viscosity not greater than three and a density differing from that of the said brine by more than about 0.2 referred to the density of pure water as equal to one.

10. In the process of separating halogen from natural brine, the steps which comprise the oxidation of the brine to liberate elementary halogen, the extraction of said liberated halogen from the brine by means of an oil which has a viscosity not greater than three referred to as water unity and a density differing from that of the said brine by more than 0.2 referred to the density of pure water as equal to one and which has a distribution coefficient for elementary halogen with respect to said brine greater than about 6.

11. The process of extracting dissolved halogen from aqueous liquids which comprises continuously mixing the said aqueous liquid with an oil and causing the mixed liquid and oil to flow continuously into a settling tank and the separated oil and liquid to flow continuously out of said tank; substantially as described.

In testimony whereof I affix my signature.

HENRI TOBLER.